Patented Oct. 6, 1931

1,826,392

UNITED STATES PATENT OFFICE

ROBERT A. DUNHAM, OF LONG BEACH, CALIFORNIA, ASSIGNOR TO UNION OIL COMPANY OF CALIFORNIA, OF LOS ANGELES, CALIFORNIA, A CORPORATION OF CALIFORNIA

RUBBER LATEX PREPARATION AND MANUFACTURE OF GOODS THEREFROM

No Drawing. Application filed October 17, 1928. Serial No. 313,182.

This invention relates to the handling of rubber latex and the production of rubber goods from latex, and it consists more particularly in the preparation either of a latex or of a raw rubber whereby a more dense and less porous rubber structure may be produced than has been possible theretofore.

Rubber latex, that is the sap of the rubber tree, consists of microscopic rubber particles in aqueous dispersion. In the case of Hevea latex, which commercially is the most important variety, each rubber particle is believed to consist of a liquid rubber hydrocarbon here designated alpha rubber which is incased in a shell of a relatively solid rubber hydrocarbon here designated beta rubber which is in turn covered with a protective layer of protein and resin. In the natural state the shell of beta rubber is observed under the microscope to be quite rigid. As a result of this rigidity when the latex is coagulated the individual rubber particles cannot conform perfectly to one another and the coagulum therefore contains a large number of voids which thereby produce a state of relative porosity in a rubber layer formed from the latex. There is also a state of relative weakness due to the fact that the rubber particles can become attached to one another only along small areas of contact by reason of the rigidity of the beta shell as above mentioned. While I believe the above theory to be correct it is to be understood of course that I am not bound thereby since actually some other condition may exist.

I have made the discovery that a certain petroleum extract can be employed as a solvent or softening agent for the beta rubber shell of the rubber particles in the latex, this softening effect (when the extract is employed in properly limited quantities) resulting in a swelling such that when the particles are coagulated the areas of contact between the contiguous particles are greatly increased whereby the walls of the particles conform almost perfectly to one another and the union between the various particles are along surfaces sufficiently extensive that the resulting rubber body contains substantially no voids. The rubber product is thus more dense and has greater tensile strength than rubber goods heretofore produced by the latex method.

The extract mentioned is known as Edeleanu extract. This extract is obtained by extraction of petroleum distillates with liquid sulfur dioxide in the refining of said distillates, such extract being a by-product of the refining operation. When the sulfur dioxide extract has been removed following the distillates treatment, the liquid sulfur dioxide itself is removed thereby leaving the above mentioned Edeleanu extract which is used in the present process, this extract being of complex composition containing various nitrogen bodies, sulfur bodies, aromatic hydrocarbons and unsaturated hydrocarbons. One desirable distillate from which the Edeleanu extract may be obtained is the kerosene mentioned in the following paragraph.

In addition to Edeleanu extract other petroleum fractions and fractions from other oils such as shale oils, tar oils and coal tars and oils, may be used where such fractions correspond generally in character to the Edeleanu extract, that is, when they contain quantities of nitrogen and sulfur bodies and unsaturated and aromatic hydrocarbons soluble in liquid $SO_2$. As an example, an acid sludge oil from the usual petroleum treatments may be employed. Acid sludge oil is recovered from acid sludge which is obtained from the treatment of various petroleum fractions (e. g. kerosene) with sulfuric acid. By hydrolyzing the sludge as with steam, the sludge separates into two layers, one of which is a solution of sulfuric acid and the other of which is known as "sludge oil" and is the acid sludge oil here designated. The effects of these agents upon latex or raw rubber are essentially the same as those of the Edeleanu extract.

Generally stated the invention, therefore, resides in the addition of the Edeleanu extract or other fraction as described, to rubber latex or to other raw rubber to effect a softening of the shells of beta rubber of the various rubber particles, whereby a rubber product formed from the latex will have a relatively dense structure substantially free from voids and will possess great tensile strength.

In carrying on the process of preparing rubber goods from rubber latex, the Edeleanu extract or other described fraction may be added to the latex in quantities so limited that the effect of the extract will produce a softening of the shells of the various particles and swelling of the various particles rather than a rupture or complete solution thereof. I have discovered that when the extract is mixed directly into the latex, the swelling and softening of the particles results without any change in their state of dispersion in the liquid. This is in marked distinction to the use of other known rubber solvents, e. g. benzol, such hydrocarbon solvents having no softening effect upon the beta shell but causing coagulation. Latex to which the extract has been added and in which the particles have been swollen by the extract is considerably more viscous than normal latex and has better spreading properties so that it will readily produce a heavy and continuous film.

Rubber goods prepared from latex containing the Edeleanu extract or other compound as above indicated, may be formed by dipping or coagulating upon a rotating roll or otherwise as known in the art. The coagulation may be caused by heat or air currents or the addition of acids or other known coagulating agents, or otherwise as preferred. Regardless of the coagulation method, the density in the resulting rubber body and the tensile strength thereof are greater than would be produced by like coagulation methods in the absence of the Edeleanu extract or other specified fraction.

The process, if desired, may be modified by dipping a form into an untreated latex, then dipping into Edeleanu extract or other described fraction, and then into a coagulating medium, and repeating the operations until the desired structure is formed. The process may be further modified by dipping the form into an untreated latex and then into Edeleanu extract or other described substance containing a coagulant such as acetic acid or sulfur dioxide, and repeating the operations to form the article. The absence of voids and the increased tensile strength is the same here as with the other methods of production.

Due to the fact that the porosity is reduced to a negligible point and the tensile strength is high, such articles as inner tubes for automobile tires may be formed very much thinner and with much less rubber than has been required heretofore. In the past appreciable thicknesses have been required to overcome the porosity and to prevent undue leakage. In other words, when latex is employed according to the present invention, the absence of porosity in the product makes it possible to prevent leakage with a very thin wall.

In vulcanizing articles formed from latex according to the present invention, any ordinary vulcanization method may be employed where all the softening agent has been removed. Such removal may be accomplished by evaporation, or by washing with a suitable solvent, e. g. acetone, or otherwise as advantageous or desirable. But when a material quantity of the agent remains in the goods it is important that the vulcanizing temperature be maintained below a certain maximum for the particular agent which is being used. In general, this maximum is 325° F. The reason for this temperature limitation is that Edeleanu extract and the other described fractions have a tendency to devulcanize the rubber when the temperature rises materially above a definite temperature, generally about 325° F. Some of the softening agent usually is present inasmuch as the last traces are not always easily removable. These traces, however, ordinarily offer no objection so long as vulcanization temperatures are maintained below the prescribed maximum.

It is to be understood that wherever the term "Edeleanu extract" is used, it is intended to cover any fraction distilled from said extract and having the required properties. For example, in some instances it may be desirable to use an agent more volatile than the original Edeleanu extract, and such agent may be readily obtained by distillation of the extract. Such an example is the fraction of Edeleanu extract boiling between 400 and 550° F. where the extract is obtained from the treatment of a California kerosene distilate.

Similarly wherever the term "sludge oil" is employed, it is intended that the expression shall include any sludge oil fraction having the necessary properties above indicated. This is particularly true where the sludge oil itself is too heavy to be suitable for the required purpose. In such case a lighter desirable fraction can be obtained by distillation.

I claim:

1. A raw rubber containing a swelling and softening agent therefor in the form of a kerosene fraction containing a major proportion of nitrogen and sulfur compounds and aromatic and unsaturated compounds.

2. A raw rubber containing an agent capable of softening the shells of the rubber particles, said agent containing nitrogen and sulfur compounds and unsaturated and aromatic compounds, largely soluble in liquid sulfur dioxide.

3. A raw rubber containing a petroleum fraction largely soluble in liquid sulfur dioxide.

4. A raw rubber containing a petroleum fraction soluble in sulfur dioxide and capable of softening the rubber particles without disruption.

5. A rubber formed from a mixture of raw rubber and a petroleum fraction largely soluble in liquid sulfur dioxide.

6. A method for preparing rubber comprising treating raw rubber with a petroleum fraction largely soluble in liquid sulfur dioxide.

7. A raw rubber containing sludge oil.

8. A method of preparing raw rubber comprising treating raw rubber particles with sludge oil in quantities sufficient to soften the shells of the rubber particles without complete dissolution thereof.

9. A method comprising preparing a raw rubber body containing sludge oil and vulcanizing said body at a temperature not exceeding approximately 325° F.

10. A raw rubber containing Edeleanu extract.

11. A method of preparing raw rubber comprising treating raw rubber with Edeleanu extract in quantities sufficient to soften the rubber without complete dissolution thereof.

12. A method comprising preparing a raw rubber body containing Edeleanu extract and vulcanizing said body at a temperature not exceeding approximately 325° F.

13. Rubber latex containing an agent capable of softening the shells of the rubber particles, said agent containing nitrogen and sulfur compounds and unsaturated and aromatic compounds, largely soluble in liquid sulfur dioxide.

14. Rubber latex containing a petroleum fraction largely soluble in liquid sulfur dioxide.

15. A rubber latex containing a swelling and softening agent in the form of a kerosene fraction soluble in sulfur dioxide.

16. A rubber latex for the preparation of rubber goods, said latex containing sludge oil.

17. A rubber latex for the preparation of rubber goods, said latex containing Edeleanu extract.

18. A coagulated rubber body formed from a mixture of rubber latex and Edeleanu extract.

19. A method of preparing raw rubber comprising adding to a rubber latex a quantity of Edeleanu extract sufficient only to soften the rubber particles of the latex and at the same time avoid solution thereof.

20. A method of preparing raw rubber from uncoagulated raw rubber comprising treating said uncoagulated raw rubber with Edeleanu extract sufficient to soften the rubber particles, and causing coagulation of the rubber particles.

21. A method of preparing a rubber body from rubber latex comprising treating rubber particles from the latex with Edeleanu extract sufficient to swell the same without solution thereof, coagulating the particles, and vulcanizing the resulting body at a temperature below approximately 325° F.

Signed at Wilmington, in the county of Los Angeles and State of California, this 11th day of October, A. D. 1928.

ROBERT A. DUNHAM.